INVENTOR
T. R. STEVENS
BY Brendan A. Ward
ATTORNEY

ERROR DETECTION SYSTEM

Filed Dec. 21, 1965 Sheet 2 of 2

United States Patent Office 3,436,486

Patented Apr. 1, 1969

3,436,486

ERROR DETECTION SYSTEM

Thomas R. Stevens, Reynoldsburg, Ohio, assignor to Bell Telephone Laboratories, Incorporated, New York, N.Y., a corporation of New York Filed Dec. 21, 1965, Ser. No. 515,410
Int. Cl. H04m 3/02, 1/66
U.S. Cl. 179—18 7 Claims

ABSTRACT OF THE DISCLOSURE

A register is provided which will reject a special signal which occurs at the wrong place in a sequence of signals, particularly a nondigital signal from a pushbutton signalling telephone.

Figure 1:
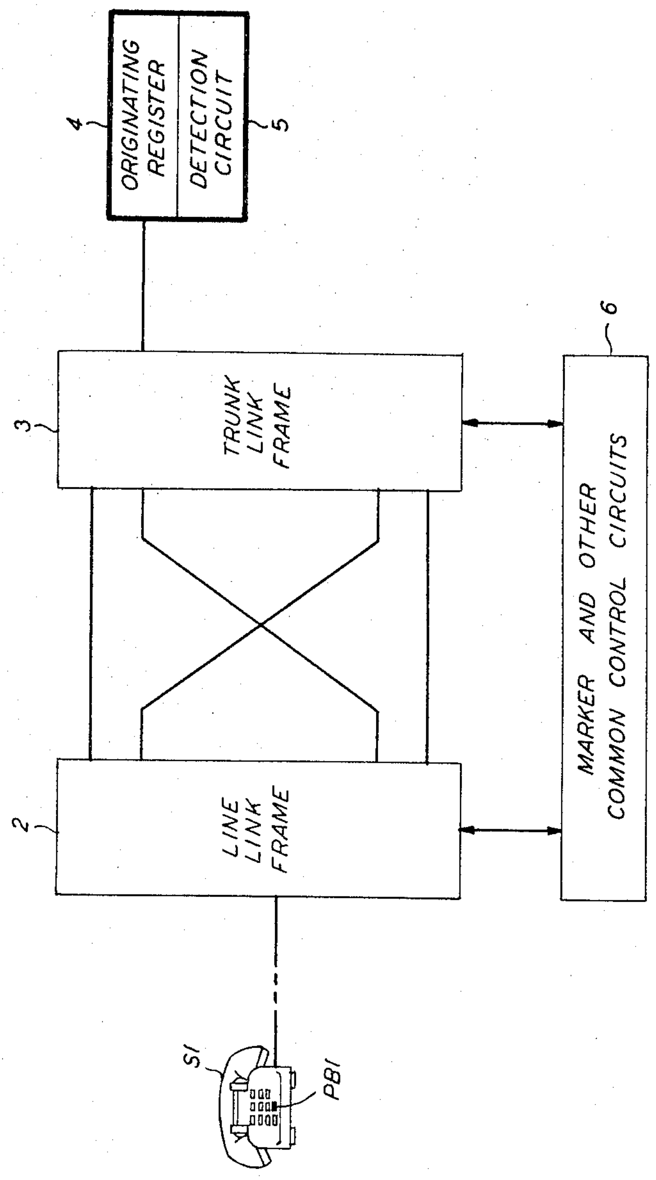

This invention relates to telephone switching systems and particularly to error detection circuit arrangements within such systems.

The improvement of telephone switching systems in recent years has resulted in the provision of numerous features which render telephone usage more convenient and more flexible. A primary objective in the design of such systems has been the rapid, efficient and economical completion of each switching function necessitated by a telephone customer's instructions. This objective has been met, in part by increasing the control the customer exercises over the switching system machine.

Such customer control was first evidenced by the spoken word communicated to an operator. Upon introduction of the rotary dial, the spoken word was replaced by instructions dialed in digital form. Thereafter, the demand by customers increased for features beyond the mere establishment of a calling connection. Obviously, as various features were introduced to meet this need, the ability of each customer to adequately convey appropriate instructions to the switching machine became of singular importance. With this problem in mind, the pushbutton subset was developed and is rapidly replacing the well-known rotary dial. This more modern subset permits the transmission of a series of signals in a fractional portion of the time formerly required. Thus, the task of the customer in conveying his instructions has been accordingly simplified.

The speed of operation of the pushbutton subset, coupled with the use of audible frequency tones, offered other distinct advantages heretofore not practically obtainable. For example, the ease of operation of the pushbutton subsets permitted the provision of extra signal buttons, each representing a nondigital instruction signal. (See, for example, Patent 3,150,236, dated Sept. 22, 1964, and issued to Gorgas et al.) Accordingly, by the depression of a single such button a customer could convey instructions which otherwise would require the transmission of a full digital code.

It is to be noted, however, that no requirement exists that a telephone customer be expert or even proficient in the use of a telephone station. Thus, provision must also be made for errors which may occur during manipulation of the subset. A classic example of such provision in the past is the well-known absorption of an initial digit "1" which is presumed to be an inadvertent switchhook generated signal (see A. J. Busch Patent No. 2,585,904, dated Feb. 19, 1952).

The problem presented by the present day use of the pushbutton set, on the other hand, is the generation, out of sequence, of a nondigital instruction signal by the inadvertent enabling of one or more of the extra signal buttons referred to hereinbefore. The obvious result of such action is a wrong number or partial dial condition with resultant customer confusion and ineffective use of telephone central office equipment.

Accordingly, it is a general object of my invention to facilitate the control which a telephone customer may exercise over a telephone system.

Another object of my invention is to reduce telephone equipment holding time by providing an inexpensive arrangement operable to immediately detect an inadvertent error in the transmission of control signals generated from a telephone station.

A further object of my invention is to provide an inexpensive arrangement operable to detect and obviate a condition which would otherwise result in a wrong number connection, whether or not such condition arose from human error or equipment malfunction.

These and other objects of my invention are attained in accordance with an exemplary embodiment comprising a common control switching system which includes registers individually connectable to a calling telephone station. Each such register is provided with a detection circuit. The detection circuit utilizes a predetermined state of the register steering relays to direct a signal resulting from the registration of a nondigital control signal forward as a trouble indication. Upon receipt of such signal, further registration is inhibited and an audible signal is returned to the calling station via the existing station to register connection.

A feature of my invention is the automatic recognition that a station-generated control signal has been transmitted out of sequence with respect to other station-generated signals.

Another feature of my invention is the arrangement of equipment which utilizes the existing state of register steering apparatus to provide a circuit path for enabling a trouble detection circuit in the event of inadvertently transmitted signals from a customer station.

Another feature of my invention is the automatic detection of a condition caused by human error or equipment malfunction which would result in a wrong number connection.

Figure 2:
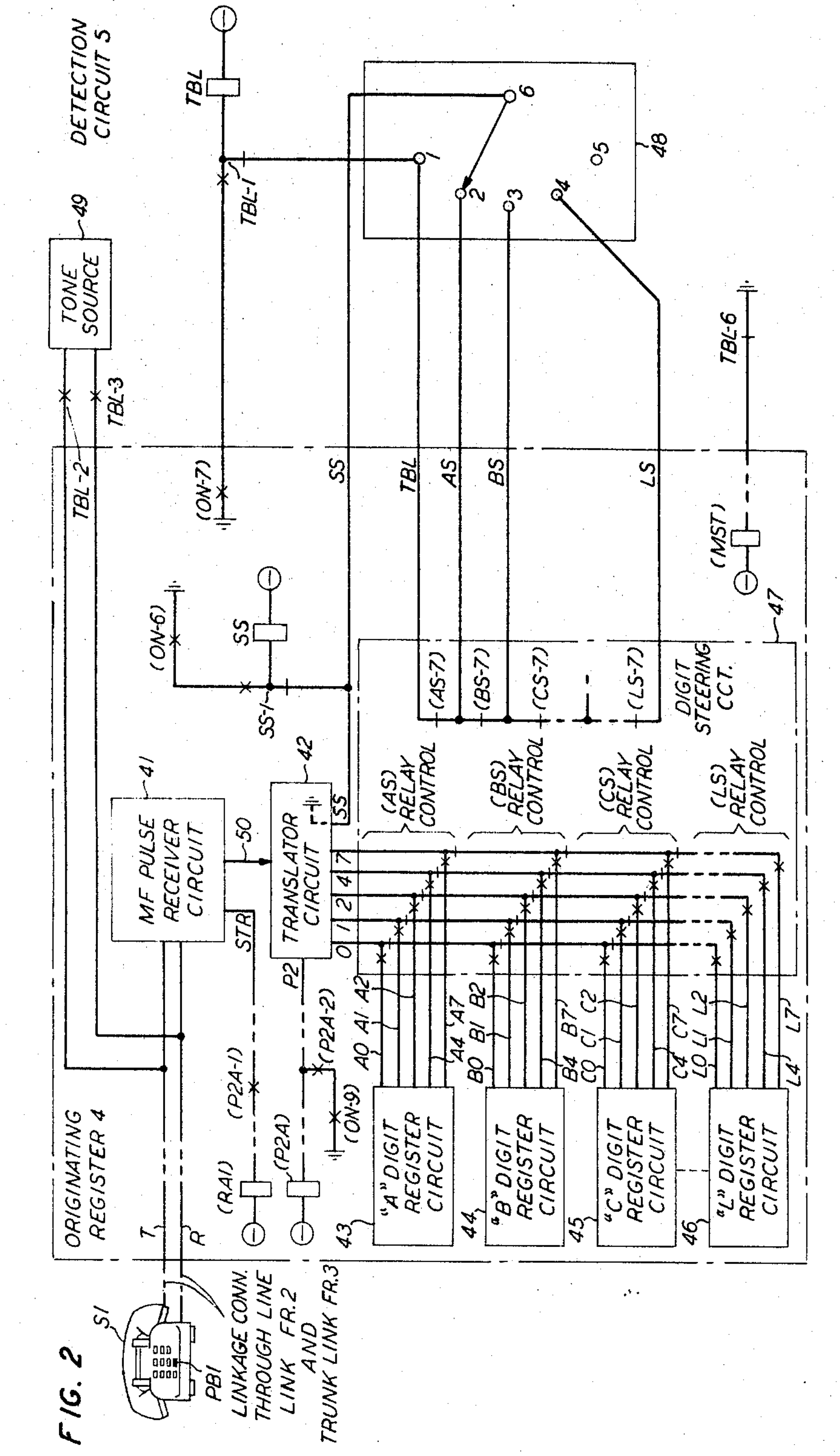

The foregoing objects and features of my invention, as well as others, will be apparent from a subsequent description of the exemplary embodiment shown in the drawing, in which:

FIG. 1 is a block diagram showing the interrelation of the component elements of the exemplary embodiment; and FIG. 2 is a schematic drawing showing in greater detail the interrelation of the components of the exemplary embodiment.

It will be noted that FIG. 2 employs a type of notation referred to as "Detached Contact" in which an "X," shown intersection a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled, "An Improved Detached-Contact-Type of Schematic Circuit Drawing," by F. T. Meyer, in the September 1955, publication of American Institute of Electrical Engineers Transactions, Communications and Electronics, volume 74, pages 505–513.

For the purpose of illustration as discussed in detail hereinafter the figures of the drawing employ apparatus disclosed in previously issued patents. In order to facilitate a clear understanding of the instant invention, such apparatus designations have been retained and are enclosed in parentheses to facilitate cross reference with the patent from which they are derived.

The present invention is illustrated in this embodiment in the common control automatic telephone system disclosed in the A. J. Busch Patent 2,585,904, issued Feb. 19, 1952. It is to be understood, however, that the present invention is not limited to use with a switching system of this type but may, in fact, be utilized with other types of switching systems.

The invention described herein is particularly concerned with apparatus in originating register 4 and detection circuit 5, which are represented by the blocks shown with heavy lines in FIG. 1 in order to distinguish them from the prior art equipment units which are neither shown nor described in detail except where necessary for a complete understanding of the invention.

For the purpose of illustration, it is intended that the apparatus of line link frame 2, trunk link frame 3, and marker and other common control circuits 6 correspond to apparatus disclosed in the above cited Busch patent. For a more complete understanding of the construction and operation of these components, the Busch patent may be consulted. It is also intended that originating register 4 be essentially identical to the originating register disclosed in detail in the Busch patent with certain modifications fully set forth hereinafter.

*Circuit operation*

The interrelation and function of equipment units of the exemplary embodiment will now be described with reference to FIG. 1. A station S1 which, for the purpose of the embodiment, is an MF (multi-frequency) or TOUCH-TONE subset is shown connected to line link frame 2. Subset S1 is provided with the usual ten pushbuttons designated 0 through 9 and is also provided with an additional control signal button designated PB1. We shall assume that station S1 is provided with one of the numerous special service features presently available to telephone customers. For example, we shall assume that station S1 is arranged to utilize the abbreviated dialing feature (see Patent 3,206,554, dated Sept. 14, 1965 and issued to Kandel et al.) wherein a 2-digit code may be transmitted to indicate to the central office control equipment that a particular 7-digit directory number should be generated by the control equipment in order to complete a calling connection to the corresponding telephone station. We shall further assume that pushbutton PB1 is provided to generate a control signal which is to precede the transmission of the abbreviated dialing code so as to inform the associated control equipment that an abbreviated dialing call is in progress.

Proceeding now with the description; upon removing the handset from the switchhook at station S1, a dial tone connection is completed as set forth in detail in the Busch patent beginning at column 6 therein. Accordingly, a linkage connection is established between line link frame 2 and trunk link frame 3 which completes an electrical communication path between station S1 and originating register 4. In the instant case, it will be noted that detection circuit 5, which is exclusively associated with originating register 4, is also effectively involved in the connection as will be more apparent from that which is contained hereinafter.

Turning now to FIG. 2; for the purpose of illustration, originating register 4 is shown as being arranged to receive and register multifrequency pulses. As is well known in the art, TOUCH-TONE dialing typically involves the depression of a nonlocking key which results in the simultaneous transmission of two distinct audio frequencies which repersent a given digit. The Busch patent discloses an originating register operable to receive dial pulses. In the instant embodiment the originating register has been modfied by the addition of MF pulse receiver circuit 41 which empolys techniques well known in the art operable to receive and momentarily register signals in the audio frequency range. In addition, translator circuit 42 is provided and constitutes a configuration well known in the art operable to translate the registered audio frequency signals into a two-out-of-five code. This two-out-of-five code is transmitted via the 0, 1, 2, 4 and 7 leads from translator circuit 42, through digit steering circuit 47, to the various A through L digit registers in a manner essentially identical to that set forth in the A. J. Busch patent.

*Conventional registration involving the transmission of a special control signal*

This section shall describe the manner in which a connection is completed wherein the special control signal is generated in its proper predetermined sequence with respect to an abbreviated dialing code.

Upon receiving dial tone at station S1 in the manner set forth in detail in the Busch patent, the subscriber momentarily operates pushbutton PB1. We shall assume that the customer has been advised that this control signal should precede the dialing of any abbreviated dialing code. Accordingly, upon the enabling of PB1, two audio frequency signals are generated over the T and R conductors to MF pulse receiver circuit 41 in originating register 4. Of course, the particular frequencies generated for the control signal are within the audio range and will distinguish from the particular frequencies employed for the transmission of digital information from subset S1. The special control signal is momentarily registered in MF pulse receiver circuit 41 in a manner well known in the art. Concurrent with such registration, corresponding output leads are enabled in cable 50 which provides an input to translator circuit 42. In addition, for reasons apparent hereinafter, a ground signal is applied to lead STR each time MF pulse receiver circuit 41 is enabled. The input to translator 42 via cable 50 is translated into a corresponding output consisting of either a two-out-of-five designation or an SS (special control signal) indication. Accordingly, at this time, in view of the transmission of a control signal, the SS lead is grounded and completes an obvious circuit path for operating the SS relay. The SS relay locks operated through make contact SS–1 through priorly enabled make contact (ON–6) to ground. Without further elaboration, we shall assume that the operated condition of relay SS informs the register that an abbreviated dialing call has been commenced and thus relay SS may be arranged to perform the necessary functions in connection therewith.

We shall further assume that the subscriber at station S1 thereupon transmits an abbreviated dialing code comprising the digits "26." Upon depression of the nonlocking key for the digit "2" at subset S1, essentially the same circuit operation takes place as hereinbefore described with the exception that the output of translator circuit 42 constitutes the enabling of the 0 and 2 leads.

As earlier set forth, each time MF pulse receiver circuit 41 is enabled, a ground signal is provided on the STR lead. As described in detail in the Busch patent, relay (P2A) operates in response to the reception of a first digit greater in value than the digit 1. In the instant case translator circuit 42 provides an output signal on the P2 lead to indicate that the received digit is greater than 1. Accordngly, relay (P2A) operates. The enabling of make contact (P2A–1) extends the ground signals provided on the STR lead to operate the (RA1) relay. As set forth in detail in the Busch patent, the operation and release of the (RA1) relay causes the advance of the digit steering circuit relays (AS) through (LS). Thus, in the instant case, as in the Busch patent, each digit transmitted after a first digit greater in value than 1 causes the operation of relay (RA1) to thereby advance the digit steering circuit to cause the registration of the transmitted digital information in the appropriate A through L digit registers. As further set forth in detail the A. J. Busch patent, upon the seizure of originating register 4, the (AS) relay is immediately enabled. As shown schematically in FIG. 2, the enabled condition of the (AS) relay contacts closes a path for forwarding the output of translator circuit 42 through digit steering circuit 47 to the input of the A digit register circuit 43 where the digit 2 is thereupon registered for subsequent use. Upon the enabling of the A digit register circuit, the (AS) relay is released and the (BS) relay is enabled. Accordingly, upon the transmission of the second digit of the abbreviated dialing code (the digit "6"), leads 2 and 4 are enabled in the output of translator circuit 42. The enabled condition of the (BS) relay contacts results in this information being steered through digit steering circuit 47 to the B register circuit 44 where the digit 6 is thereupon registered for subsequent use.

Upon the registration of the aforesaid code in conjunction with the prefixed control signal, circuit operation takes place in the manner, for example, as set forth in the earlier cited Kandel et al. patent.

*Inadvertent enabling of pushbutton PB1*

In this section we shall describe the circuit operation which occurs upon the inadvertent enabling of pushbutton PB1. We shall assume that the customer does not intend to utilize the abbreviated dialing feature at this time. But, rather the customer intends to dial a complete directory number not requiring a prefixed control signal, during the course of which the PB1 button is enabled in error. It will be obvious from the following that the same circuit operation will follow where a prefixed control signal is required and is provided but is also subsequently inadvertently repeated.

Turning briefly to detection circuit 5, it will be noted that selector switch 48 is shown as interconnecting the SS lead with any one of a plurality of terminals leading to contacts on the digit steering relays (AS) through (LS). It is intended that selector switch 48 symbolically represents any number of arrangements which may be employed to interconnect the SS lead with the appropriate one of the AS through LS leads. As will be more apparent from that which is contained hereinafter, the SS lead may be associated with the AS lead so as to provide a trouble detection indication upon the inadvertent transmission of a control signal at any time after the prior transmission of a first digit. On the other hand, in like fashion the SS lead may be connected through to the BS lead so as to provide a trouble detection indication only in the event that the special control signal is transmitted at a point in time after the prior transmission of two digits from the calling station. Accordingly, in similar fashion the SS lead may be associated with any of the other leads, such as CS through LS, so as to provide a trouble detection indication at any predetermined point during the transmission of a series of digital signals. Thus, it is obvious that selector switch 48 represents what may in fact consist of direct wiring, a manually operable selector switch, or numerous other arrangements well known in the art suitable to interconnect the SS lead and a lead to the contacts of the appropriate digit steering relay in a predetermined manner.

Proceeding now with the description; we shall assume that the subscriber has transmitted a first digit, such as, for example, the digit 8. Accordingly, leads 1 and 7 are enabled at the output of translator circuit 42 and the resulting signal is directed through enabled make contacts on the (AS) relay in digit steering circuit 47 to the A digit register circuit 43 as above set forth. Thus, in preparation for the reception of a second digit, relay (BS) operates and relay (AS) is released as earlier described. We shall assume at this point that the subscriber at station S1 inadvertently enables pushbutton PB1. As earlier set forth, this results in the enabling of the SS lead at the output of translator circuit 42. Thus, relay SS operates as an indication that an abbreviated dialing call is to commence. However, at the same time the signal present on the SS lead is also extended to selector switch 48 in detection circuit 5 where it is further extended to the AS lead via selector switch terminal 2, through a released break contact on the (AS) relay, via the TBL lead to terminal 1 of selector switch 48, through released break contact TBL–1, and via the winding of relay TBL to negative battery. Relay TBL accordingly operates as an indication that a control signal has been transmitted out of predetermined sequence with respect to other signals from a subscriber station.

It may be noted at this point that, if the SS lead were connected through switch 48 to the BS lead, a trouble indication would not occur at this time since the enabled condition of the (BS) relay would prevent the operation of relay TBL. However, assuming the SS lead were so connected through to the BS lead, if a control signal were transmitted subsequent to the registration of an A and B digit, relay (BS) would be released and, accordingly, the TBL relay would operate at this time. Thus, the circuit arrangement set forth is fully flexible in that, dependent upon the predetermined relationship between the SS lead and the particular connection into the chain of break contacts on the steering relays AS through LS, a control signal is recognized as inadvertent if received after any predetermined point in a train of digits transmitted by a calling station.

Proceeding now with the description, the operation of relay TBL enables make contacts TBL–2 and TBL–3 so as to impress tone source 49 across the T and R conductors to station S1. Tone source 49 may comprise any number of configurations well known in the art operative to provide a distinct audible signal to the calling station.

In addition to the foregoing, enabled make contact 6 of relay TBL opens the operate path of relay (MST) to prevent marker seizure as set forth in the Busch patent.

Thus, further register function is inhibited and tone is returned to the subscriber via the register-subset connection. Station S1 is accordingly alerted to the fact that the call must be repeated.

It is obvious from the foregoing, of course, that the generation of the control signal may have been caused by an equipment malfunction as opposed to customer error. In either event the functioning of detection circuit 5 is the same; a wrong number or partial dial condition is eliminated, and the customer is advised that the call must be reinitiated.

While the equipment of this invention has been described with reference to a particular embodiment wherein a control signal generated out of sequence from a telephone station is immediately detected, it is to be understood that such an embodiment is intended merely to be illustrative of the present invention and that numerous other arrangements may be devised by those skilled in the art without departing from the spirit and scope of the invention.

For example, the invention may be employed where the source of signals is from other than a telephone station, i.e., from another common control circuit, or from a console position or switchboard.

Another example would be where the invention is employed to cause the erasure of the information inadvertently transmitted, with a suitable signal to the station to indicate a failure to register such information.

What is claimed is:

1. In a telephone system, selectively operable signaling means for generating a plurality of exclusive signals including a special signal, means connectable to said signaling means for receiving and registering each signal, and means operable in response to the reception of said special signal in other than predetermined sequence with respect to other said signals for inhibiting further operation of said register means.

2. The combination set forth in claim 1 further comprising a signal source controlled by said inhibiting means for impressing a signal on said connection between said signaling means and said register means.

3. In a telephone system, a subset comprising a selectively operable signal generator for generating a plurality of exclusive signals including a special signal, a register connectable to said subset for receiving and and registering each said signal, error detecting means operable in response to the reception of said special signal in other than predetermined sequence with respect to other said signals, and control means operable in response to said error detecting means.

4. The combination set forth in claim 3 further comprising a tone source controlled by said error detecting means for transmitting a tone to said subset via said register-subset connection.

5. In a switching system, a plurality of selectively operable nonlocking keys including a special service key, means operative in response to the enabling of each of said keys for generating an exclusive code, means for sequentially registering each said generated code, means for detecting the registration of the code associated with said special service key in other than predetermined sequence, and means controlled by said detecting means for inhibiting further operation of said register means.

6. In a telephone system, a pushbutton telephone set comprising a plurality of selectively operable nonlocking keys including a special key, means operative in response to the enabling of each of said keys for generating an exclusive signal, means for sequentially registering an arbitrarily selected group of said signals, means controlled by said telephone set for connecting said telephone set to said register means, means responsive to the registration of a group including the signal associated with said special key for verifying the relative sequential position of said special service signal in said group, and means responsive to the registration of said special service signal in other than predetermined sequence with respect to other said signals in said group for inhibiting further operation of said register means and for impressing an audible signal upon said register-telephone set connection.

7. The combination set forth in claim 6 wherein said register means further comprises a plurality of individual signal registers and a steering circuit for directing successive said exclusive signals into succeeding said signal register, and wherein said verification means is controlled by said register means steering circuit.

References Cited

UNITED STATES PATENTS

| | | | |
|---|---|---|---|
| 3,123,809 | 3/1964 | Brouwer | 179—18 |
| 3,231,677 | 1/1966 | Edstrom et al. | 179—18 |

WILLIAM C. COOPER, *Primary Examiner.*

U.S. Cl. X.R.

179—84